United States Patent
Kim et al.

(10) Patent No.: US 8,769,778 B2
(45) Date of Patent: Jul. 8, 2014

(54) TETHER CLIP

(75) Inventors: Hyun Kim, Hwaseong-si (KR); Hee Sang Park, Hwaseong-si (KR); June Kyu Park, Hwaseong-si (KR); Jun Mo Ku, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/595,874

(22) Filed: Aug. 27, 2012

(65) Prior Publication Data

US 2013/0152346 A1 Jun. 20, 2013

(30) Foreign Application Priority Data

Dec. 15, 2011 (KR) .................. 10-2011-0135790

(51) Int. Cl.
B60R 21/20 (2011.01)
B60R 21/213 (2011.01)
B60R 21/216 (2011.01)
F16B 2/20 (2006.01)

(52) U.S. Cl.
USPC ............. 24/289; 24/297; 24/453; 24/457; 24/581.11; 280/728.2

(58) Field of Classification Search
USPC .......... 280/728.2, 728.3, 730.2; 24/289, 297, 24/453, 457, 581.11
See application file for complete search history.

(56) References Cited

U.S. PATENT DOCUMENTS

| | | | |
|---|---|---|---|
| 6,431,584 B1 | 8/2002 | Nagasawa et al. | |
| 6,952,863 B2 * | 10/2005 | Draggoo et al. | 24/297 |
| 7,073,231 B2 * | 7/2006 | Draggoo et al. | 24/297 |
| 7,155,783 B2 * | 1/2007 | Nessel et al. | 24/289 |
| 7,178,850 B2 * | 2/2007 | Smith et al. | 296/29 |
| 7,188,393 B2 * | 3/2007 | Kawai | 24/297 |
| 7,331,602 B2 * | 2/2008 | Ochiai et al. | 280/730.2 |
| 7,454,826 B2 * | 11/2008 | Nessel et al. | 29/453 |
| 7,832,064 B2 * | 11/2010 | Nessel et al. | 24/297 |
| 8,297,646 B2 | 10/2012 | Aoki | |
| 8,480,120 B1 * | 7/2013 | Fukuda et al. | 280/728.2 |
| 2003/0107202 A1 * | 6/2003 | Tajima et al. | 280/728.3 |
| 2004/0075250 A1 | 4/2004 | Choi | |
| 2008/0014045 A1 * | 1/2008 | Kawai | 411/45 |
| 2008/0098576 A1 * | 5/2008 | Smith et al. | 24/297 |

FOREIGN PATENT DOCUMENTS

| | | |
|---|---|---|
| JP | 7-35114 A | 2/1995 |
| JP | 2002037007 (A) | 2/2002 |
| JP | 2010-159013 A | 7/2010 |
| KR | 10-2006-0098606 A | 9/2006 |
| KR | 10-2011-0011898 A | 2/2011 |

\* cited by examiner

*Primary Examiner* — Robert J Sandy
*Assistant Examiner* — Louis Mercado
(74) *Attorney, Agent, or Firm* — Morgan, Lewis & Bockius LLP (57) ABSTRACT

A tether clip apparatus preventing an A pillar from completely separating from a car body at the time of deploying an airbag, may include a pillar fixing clip fixed to the A pillar, a car body fixing clip configured to be fixed to a car body panel, inserted with the pillar fixing clip, and preventing the A pillar from completely separating from the car body panel while moving within the pillar fixing clip at the time of deploying the airbag, and a metal clip elastically supporting the pillar fixing clip and the car body fixing clip so as not to separate from each other.

8 Claims, 6 Drawing Sheets

TETHER CLIP

CROSS-REFERENCE TO RELATED APPLICATION

The present application claims priority to Korean Patent Application No. 10-2011-0135790, filed on Dec. 15, 2011 in the Korean Intellectual Property Office, the entire contents of which is incorporated herein for all purposes by this reference.

BACKGROUND OF THE INVENTION

1. Field of the invention

The present invention relates to a tether clip preventing an A pillar from completely separating from a car body while forming a gap between the car body and the A pillar when an airbag is operated.

2. Description of Related Art

Figure 1:
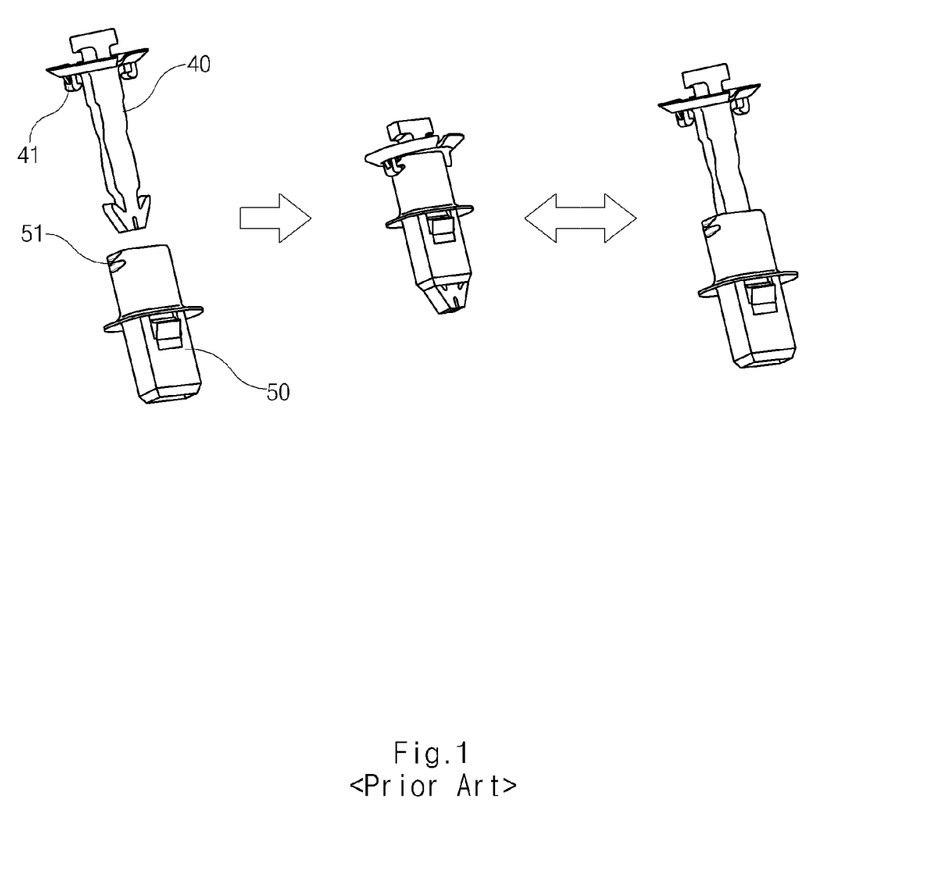
FIG. 1 is a diagram showing a tether clip according to the related art.

As shown in FIG. 1, a tether clip according to the related art is provided with a first pre-assembling part 41 and a second pre-assembling part 51 for pre-fixing a pillar fixing clip 40 and a car body fixing clip 50 before an airbag is deployed, wherein the first pre-assembling part 41 is made of plastic and thus, has physical properties that change according to temperature and humidity of the outside environment, to thereby make it difficult to obtain high-level reliability. For example, the material of the first pre-assembling part 41 becomes soft at the time of high temperature, which weakens separation preventing force, but is solid at low temperature, which strengthens the separation preventing force, such that deviation of the separation preventing force negatively affects product reliability.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a tether clip with high reliability by implementing the same operating force regardless of the outside environment, and providing a tether clip designed to easily control operating force.

In one aspect of the present invention, a tether clip apparatus preventing an A pillar from completely separating from a car body at the time of deploying an airbag, may include a pillar fixing clip fixed to the A pillar, a car body fixing clip configured to be fixed to a car body panel, inserted with the pillar fixing clip, and preventing the A pillar from completely separating from the car body panel while moving within the pillar fixing clip at the time of deploying the airbag, and a metal clip elastically supporting the pillar fixing clip and the car body fixing clip so as not to separate from each other.

The pillar fixing clip may include a pillar fixing part provided at an end of the pillar fixing clip and fixed to the A pillar, a first pre-assembling part provided at a middle portion of the pillar fixing clip and extending from the pillar fixing part, wherein the first pre-assembling part is pre-assembled with a second pre-assembling part of the car body fixing clip to regulate a deploying force of the airbag, and a separation preventing part provided at the other end of the pillar fixing clip, wherein the separation preventing part is coupled to a hook of the car body fixing clip at the time of deploying the airbag to prevent the pillar fixing clip from being drawn out after the pillar fixing clip is drawn out by a predetermined distance from the car body fixing clip.

The car body fixing clip may include the second pre-assembling part provided at an end thereof and fitted in the first pre-assembling part, the hook provided at the other end thereof and interfering with the separating preventing part of the pillar fixing clip at the time of deploying the airbag to stop a movement of the separation preventing part, and a car body fixing part provided at an outer surface thereof and fixed to the car body panel.

The metal clip elastically supports the first pre-assembling part and the second pre-assembling part so as not to separate from each other, such that the firs pre-assembling part and the second pre-assembling part are fixed to each other by elasticity of the metal clip and the first pre-assembling part and the second pre-assembling part are separated from each other when an airbag deploying force is larger than the elasticity of the metal clip at the time of deploying the airbag so as to draw out the pillar fixing clip from the car body fixing clip.

Both lateral sides of the second pre-assembling part are provided with slits, such that the second pre-assembling part is provided in a cantilever shape toward an end of the car body fixing clip, wherein an end of the cantilever shape is provided with an inclined surface inclined in a drawing out direction of the pillar fixing clip, and wherein the first pre-assembling part is provided with an inclined surface corresponding to the inclined surface of the second pre-assembling part.

The first pre-assembling part is disposed at an inside of the second pre-assembling part, wherein an outer surface of the second pre-assembling part is fitted with an inner surface of the metal clip having a "⊐"-letter shape, and wherein the metal clip is fixed to the car body fixing part by fitting a fixing hole provided at the other surface thereof having a "⊐"-letter shape in a protrusion provided at the car body fixing part.

The first pre-assembling part is recessed to form a groove, and the second pre-assembling part is provided with a protrusion so as to be coupled with the groove of the first pre-assembling part.

A top portion of the car body fixing clip is provided with the slits at the left and right thereof so as to form the second pre-assembling part having an upward cantilever shape.

An outer surface of the car body fixing clip is provided with a protrusion, and the metal clip is provided with a fixing hole so as to fit the protrusion therein.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to FIGS. 2 to 7.

The exemplary embodiment of the present invention relates to a tether clip for preventing an A pillar from completely separating from a car body when an air bag is deployed. The tether clip includes a pillar fixing clip 10, a car body fixing clip 20, and a metal clip 30.

The pillar fixing clip 10 is pre-assembled by being fitted in a hollow part of the car body fixing clip 20 and is drawn out by a predetermined length from a car body fixing clip at the time of deploying an airbag and then, stops, such that the A pillar is deployed to some degree from the car body. By this configuration, a space to deploy and come out the air bag is secured.

A detailed configuration of the tether clip is as follows.

Figure 2:
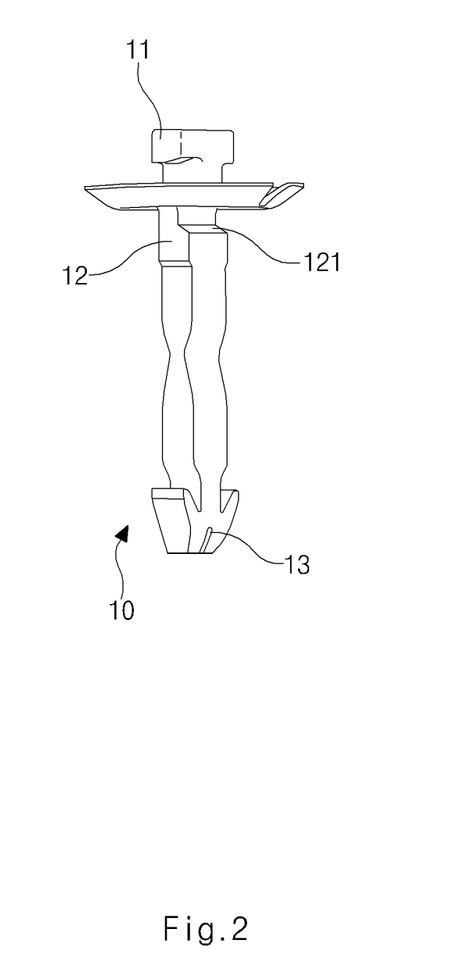
FIGS. 2 to 4 are perspective views each showing a pillar fixing clip, a car body fixing clip, and a metal clip of a tether clip according to the exemplary embodiment of the present invention.

First, describing the pillar fixing clip, as shown in FIG. 2, a top end of the pillar fixing clip is provided with a T-shaped pillar fixing part 11 fixed to the A pillar and a bottom part thereof is provided with a flange shape part. When the pillar fixing part 11 is fixed to the A pillar, the flange shape part is closely attached to the A pillar.

Further, a bottom portion of the flange shape part of the pillar fixing clip is provided with the first pre-assembling part 12 provided with an inclined surface 121 inclined outwardly downwardly in a state in which the first pre-assembling part 12 is partially depressed. The bottom portion of the first pre-assembling part 12 is provided with a rectangular pillar having a predetermined length. The length of the rectangular pillar is approximately equal to an interval at which the A pillar is separated from the car body at the time of deploying the airbag or a distance at which the pillar fixing clip 10 is drawn out from the car body fixing clip 20.

That is, the first pre-assembling part 12 is depressed to form a groove 60 and the second pre-assembling part 21 is provided with a protrusion 65 so as to be coupled with the groove 60 of the first pre-assembling part 12.

Finally, a bottom end of the pillar fixing clip is provided with a separation preventing part 13 having a double hook shape protruded outwardly to both sides thereof in a shape of the rectangular pillar. The separation preventing part 13 is horizontally disposed with respect to a mounting direction of the inclined surface 121, which is to prevent the separation preventing part 13 from interfering with the second pre-assembling part 21 to be described below when the pillar fixing clip 10 is drawn out from the car body fixing clip 20. On the other hand, the reason is that it is more advantageous in design to form a hook 25 deviating from a shaft line than to form the hook 25 on the same vertical shaft line as the second pre-assembling part 21 to be described below in the car body fixing clip.

Figure 3:
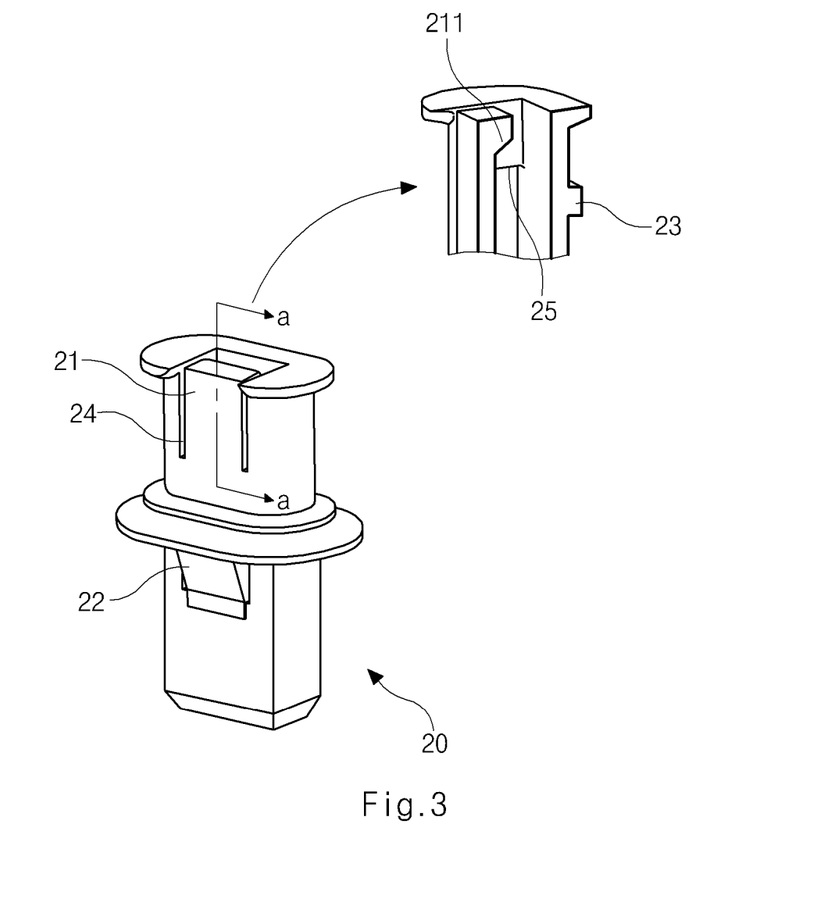

Next, describing the car body fixing clip 20, the car body fixing clip is vertically provided with a hollow part in which the pillar fixing clip having the rectangular pillar shape may be accommodated. As shown in FIG. 3, the top surface of the car body fixing clip 20 is a surface closely attached to the bottom surface of the flange shape part of the pillar fixing clip 10 at the time of the pre-assembling. The top portion of the car body fixing clip is provided with the second pre-assembling part 21 having an upward cantilever shape due to slits 24 provided at the left and right thereof.

The second pre-assembling part 21 is pre-assembled with the first pre-assembling part 12, wherein the end having the cantilever shape is provided with an inclined surface 211 inclined upwardly toward an inside to correspond to the inclined surface 121 of the separating preventing part. A protruded shape due to the inclined surface at the end of the cantilever corresponds to a shape in which the first pre-assembling part 12 is partially depressed.

Further, both sides of the second pre-assembling part 21 in the hollow part of the car body fixing clip are provided with the hook 25, wherein the top portion of the hook 25 is stepped-up from the bottom portion thereof so as to interfere with the separating preventing part 13. In addition, an outer surface of the car body fixing clip disposed at an opposite side to the second pre-assembling part 21 is provided with a protrusion 23, which has a shape fitted in the fixing hole 31 of the metal clip to be described below.

Meanwhile, a middle portion of the car body fixing clip is provided with the flange shape part contacting the car body when the car body fixing clip is fixed to the car body by the car body fixing part 22 to be described below and the bottom portion of the flange shape part is provided with the car body fixing part 22.

Figure 4:
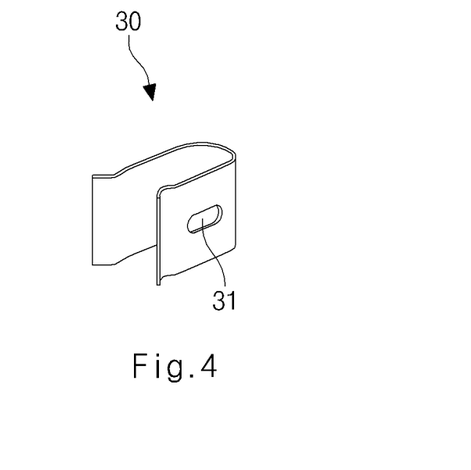

Next, describing with reference to FIG. 4, one side of the metal clip 30 has a "⊤"-letter shape corresponding to the car body fixing clip, wherein one side thereof inwardly presses the second pre-assembling part 21 and the other side thereof is provided with a fixing hole 31 fitted in the protrusion 23.

An assembling shape of the tether clip configured as described above is shown in FIGS. 5 to 7. The pillar fixing clip is fitted in the car body fixing clip. In this state, the first pre-assembling part 12 is engaged with the second pre-assembling part 21. The second pre-assembling part 21 is pressed inwardly in the state in which the metal clip 30 is fitted in a circumference of the second pre-assembling part 21, such that the first pre-assembling part is firmly fixed to the second pre-assembling part.

Figure 5:
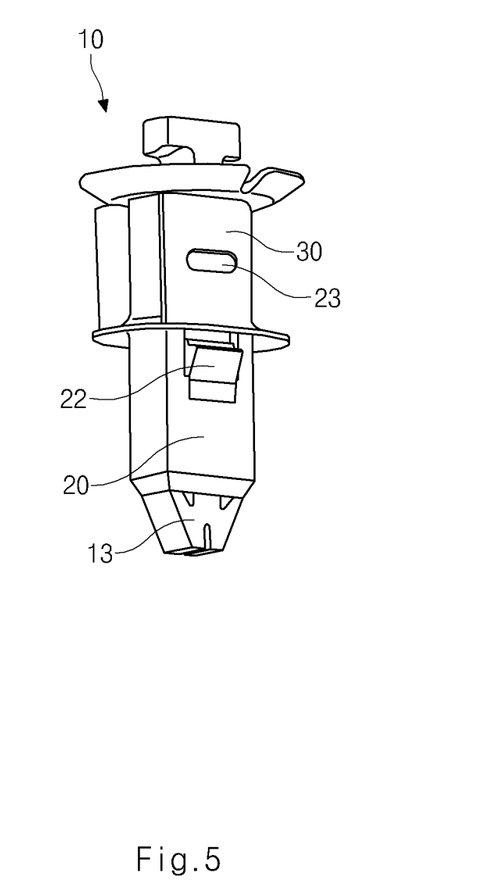
FIG. 5 is an assembling perspective view each showing the pillar fixing clip, the car body fixing clip, and the metal clip of the tether clip according to the exemplary embodiment of the present invention.

The pillar fixing part 11 on the top portion of the pillar fixing clip 10 is fixed to the A pillar and the car body fixing part 22 on the bottom portion of the car body fixing clip 20 is fixed to the car body.

When the airbag is operated due to a collision of a vehicle, or the like, the operating force of the airbag pushes the A pillar so as to be far away from the car body.

Figure 6:
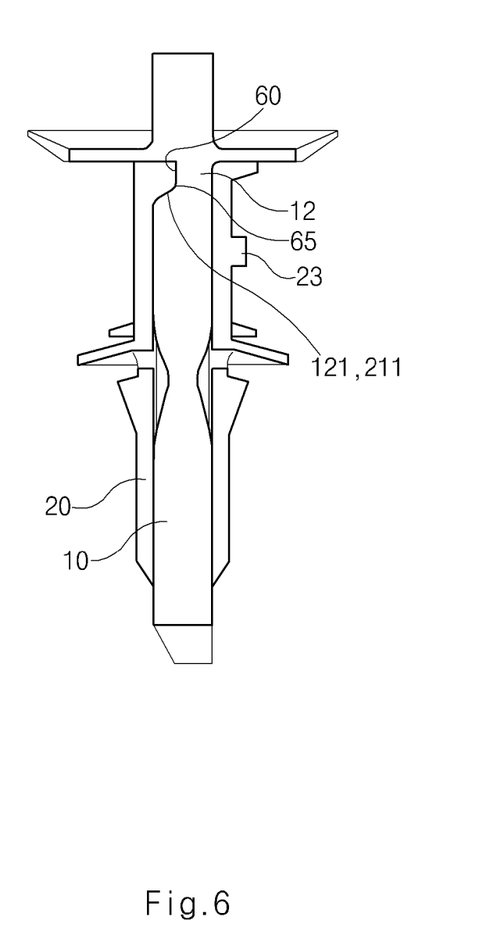
FIG. 6 is a cross-sectional view of the tether clip of FIG. 5 to show the first and second pre-assembling parts and an inclined surface (a metal clip is not shown).

In this case, the inclined surface 121 of the first pre-assembling part 12 of the pillar fixing clip fixed to the A pillar pushes up the inclined surface 211 of the second pre-assembling part 21 and the cantilever shape part of the second pre-assembling part 21 is spread outwardly from along the slope of the airbag and when the operating force of the airbag overwhelms the elastic force of the metal clip 30, the first pre-assembling part is separated from the second pre-assembling part.

Figure 7:
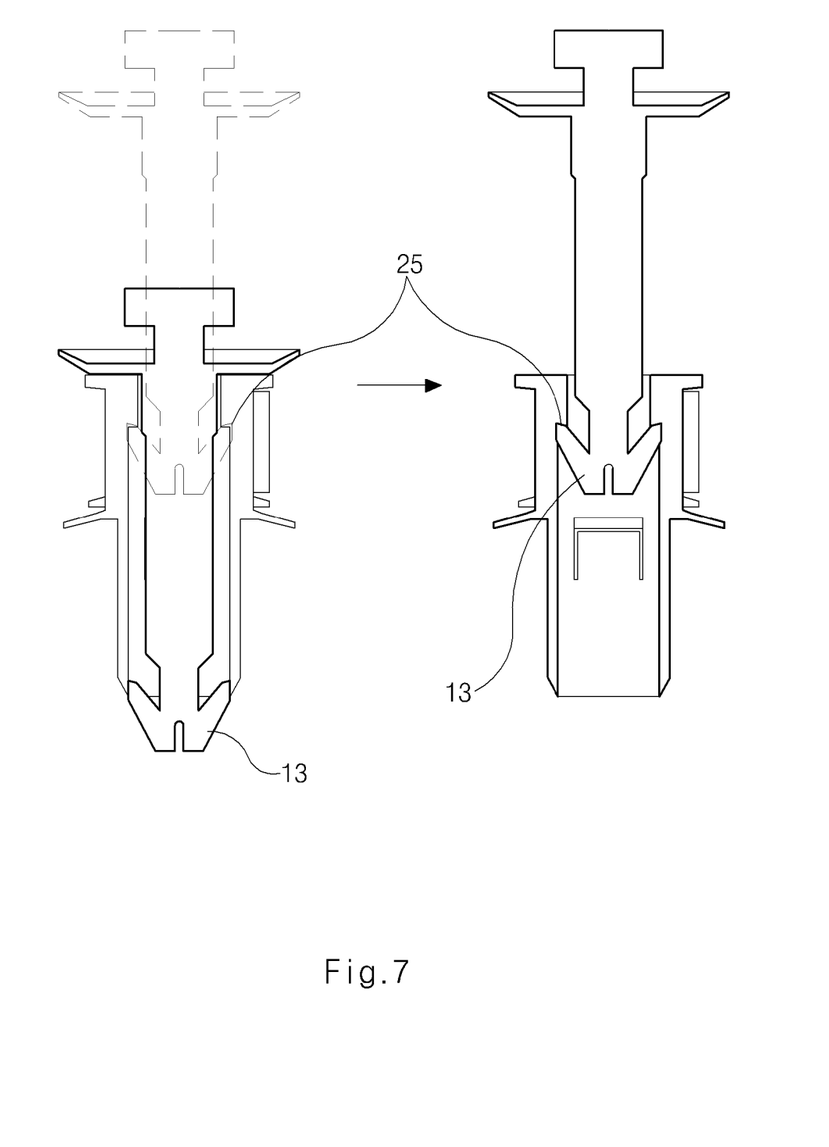
FIG. 7 is a cross-sectional view of a tether clip of FIG. 5 to show a separation preventing part and a hook.

Further, when the separation preventing part 13 is hooked to the hook 25 while the pillar fixing clip 10 is drawn out from the car body fixing clip 20, the pillar fixing clip 10 is no longer drawn out and then, stops. Therefore, the gap between the pillar fixing clip and the car body fixing clip is generated by the drawn-out length.

Here, the deploying force of the airbag can be controlled by a method for allowing the inclined surfaces 121 and 211 to control the inclined angle. For example, as the inclined surface is steep (as the inclined surface approximates to a vertical line in the drawing), the pre-assembling parts 12 and 21 are easily separated from each other even by a small deploying force. On the other hand, as the inclined surface is smooth (as the inclined surface approximates to a horizontal line in the drawing), the pre-assembling parts can be separated from each other only by a large deploying force.

Meanwhile, when A/S, or the like, is performed, the pre-assembling parts 12 and 21 can be easily separated from each other in the state in which the metal clip is spread.

As set forth above, according to the exemplary embodiment of the present invention, the pre-assembling strength is controlled by the metal clip and thus, the pre-assembling strength is not affected by the external environments unlike plastic, to thereby make it possible to manufacture products with high reliability. Further, the operating force of the tether clip can be controlled by controlling the inclined surface angle of the pre-assembling part, to thereby facilitate the design of the tether clip.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tether clip apparatus preventing an A pillar from completely seperating from a car body at a time of deploying an airbag, the tether clip comprising:
   a pillar fixing clip fixed to the A pillar;
   a car body fixing clip configured to be fixed to a car body panel, inserted with the pillar fixing clip, and preventing the A pillar from completely separating from the car body panel while moving within the pillar fixing clip at the time of deploying the airbag; and
   a metal clip elastically supporting the pillar fixing clip and the car body fixing clip so as not to separate from each other;
   wherein the pillar fixing clip includes:
   a pillar fixing part provided at an end of the pillar fixing clip and fixed to the A pillar;
   a first pre-assembling part provided at a middle portion of the pillar fixing clip and extending from the pillar fixing part, wherein the first pre-assembling part is pre-assembled with a second pre-assembling part of the car body fixing clip to regulate a deploying force of the airbag; and
   a separation preventing part provided at an other end of the pillar fixing clip, wherein the separation preventing part is coupled to a hook of the car body fixing clip at the time of deploying the airbag to prevent the pillar fixing clip from being drawn out after the pillar fixing clip is drawn out by a predetermined distance from the car body fixing clip.

2. The tether clip apparatus according to claim 1, wherein the car body fixing clip includes:
   the second pre-assembling part provided at an end thereof and fitted in the first pre-assembling part;
   the hook provided at the other end thereof and interfering with the separating preventing part of the pillar fixing clip at the time of deploying the airbag to stop a movement of the separation preventing part; and
   a car body fixing part provided at an outer surface thereof and fixed to the car body panel.

3. The tether clip apparatus according to claim 2, wherein the metal clip elastically supports the first pre-assembling part and the second pre-assembling part so as not to separate from each other, such that the first pre-assembling part and the second pre-assembling part are fixed to each other by elasticity of the metal clip and the first pre-assembling part and the second pre-assembling part are separated from each other when an airbag deploying force is larger than the elasticity of the metal clip at the time of deploying the airbag so as to draw out the pillar fixing clip from the car body fixing clip.

4. The tether clip apparatus according to claim 3,
   wherein both lateral sides of the second pre-assembling part are provided with slits, such that the second pre-assembling part is provided in a cantilever shape toward an end of the car body fixing clip;
   wherein an end of the cantilever shape is provided with an inclined surface inclined in a drawing out direction of the pillar fixing clip; and
   wherein the first pre-assembling part is provided with an inclined surface corresponding to the inclined surface of the second pre-assembling part.

5. The tether clip apparatus according to claim 3, wherein the first pre-assembling part is recessed to form a groove, and
   the second pre-assembling part is provided with a protrusion so as to be coupled with the groove of the first pre-assembling part.

6. The tether clip apparatus according to claim 3, wherein an outer surface of the car body fixing clip is provided with a protrusion, and
   the metal clip is provided with a fixing hole so as to fit the protrusion therein.

7. The tether clip apparatus according to claim 4,
   wherein the first pre-assembling part is disposed at an inside of the second pre-assembling part,
   wherein an outer surface of the second pre-assembling part is fitted with an inner surface of the metal clip having a "C"-letter shape; and
   wherein the metal clip is fixed to the car body fixing clip by fitting a fixing hole provided at the other surface thereof on a protrusion provided at the car body fixing clip.

8. The tether clip apparatus according to claim 4, wherein a top portion of the car body fixing clip is provided with the slits at a left and right thereof so as to form the second pre-assembling part having an upward cantilever shape.

* * * * *